(12) United States Patent
Lapidot et al.

(10) Patent No.: US 10,962,778 B2
(45) Date of Patent: Mar. 30, 2021

(54) APPARATUS AND METHOD FOR AUGMENTED REALITY

(71) Applicant: VEERIDE LTD., Rehovot (IL)

(72) Inventors: Zvi Lapidot, Rehovot (IL); Ehud Tirosh, Mevaseret Zion (IL); Oded Arnon, Tel Aviv (IL)

(73) Assignee: VEERIDE LTD., Rehovot (IL)

( * ) Notice: Subject to any disclaimer, the term of this patent is extended or adjusted under 35 U.S.C. 154(b) by 0 days.

(21) Appl. No.: 16/326,345

(22) PCT Filed: Aug. 3, 2017

(86) PCT No.: PCT/IL2017/050859
§ 371 (c)(1),
(2) Date: Feb. 18, 2019

(87) PCT Pub. No.: WO2018/033903
PCT Pub. Date: Feb. 22, 2018

(65) Prior Publication Data
US 2019/0227314 A1 Jul. 25, 2019

(30) Foreign Application Priority Data
Aug. 18, 2016 (IL) .......................................... 247360

(51) Int. Cl.
*G02B 27/01* (2006.01)
*G06F 3/01* (2006.01)
(Continued)

(52) U.S. Cl.
CPC ..... *G02B 27/0149* (2013.01); *G02B 27/0101* (2013.01); *G06F 3/011* (2013.01);
(Continued)

(58) Field of Classification Search
CPC .......... G02B 2027/011; G02B 27/0101; G02B 27/0149; G06F 3/011; G06F 3/1423; H04M 1/0254; H04M 1/0272; H04M 1/215
See application file for complete search history.

(56) References Cited

U.S. PATENT DOCUMENTS

| 6,637,896 B2 * | 10/2003 | Li | ......................... G03B 21/10 353/119 |
| 8,820,936 B2 * | 9/2014 | Chen | .................... H04M 1/0206 353/7 |

(Continued)

FOREIGN PATENT DOCUMENTS

| JP | 2013-214856 A | 10/2013 |
| JP | 3197950 U | 6/2015 |

OTHER PUBLICATIONS

International Search Report and Written Opinion for PCT/IL2017/050859, dated Jan. 17, 2018, 13 pages.
(Continued)

*Primary Examiner* — Dmitriy Bolotin
(74) *Attorney, Agent, or Firm* — P. G. Scott Born; Foster Garvey P.C.

(57) ABSTRACT

Accessories and methods are disclosed for projecting content generated by a hand-held device (100) on reality. An accessory (2) includes a housing (102) configured for mechanically attaching to the hand-held device, and viewing optics (108) within the housing configured to project an image of content generated by the hand-held device on reality via a see through display (23). In some applications, the hand-held device is a smartphone.

19 Claims, 7 Drawing Sheets

(51) Int. Cl.
*G06F 3/14* (2006.01)
*H04M 1/02* (2006.01)
*H04M 1/215* (2006.01)

(52) U.S. Cl.
CPC ...... *G06F 3/1423* (2013.01); *G02B 2027/011* (2013.01); *H04M 1/0254* (2013.01); *H04M 1/0272* (2013.01); *H04M 1/215* (2013.01)

(56) References Cited

U.S. PATENT DOCUMENTS

| | | | |
|---|---|---|---|
| 8,970,960 B2* | 3/2015 | Yu | A63F 13/10 |
| | | | 359/630 |
| 9,651,781 B2* | 5/2017 | Shih | G02B 27/0149 |
| 2010/0045569 A1* | 2/2010 | Estevez | G06F 3/011 |
| | | | 345/3.1 |
| 2012/0050144 A1 | 3/2012 | Morlock | |
| 2014/0104692 A1 | 4/2014 | Bickerstaff et al. | |
| 2014/0152531 A1 | 6/2014 | Murray et al. | |
| 2014/0177023 A1* | 6/2014 | Gao | G02B 25/001 |
| | | | 359/238 |
| 2015/0234189 A1* | 8/2015 | Lyons | A63F 13/26 |
| | | | 345/174 |
| 2015/0235426 A1* | 8/2015 | Lyons | G06F 3/0231 |
| | | | 345/8 |
| 2017/0330376 A1* | 11/2017 | Haseltine | G06F 3/011 |
| 2019/0171013 A1* | 6/2019 | Hu | G02B 6/4204 |
| 2020/0213433 A1* | 7/2020 | Griffith | H04M 1/0272 |

OTHER PUBLICATIONS

Sinha, Robin, "Lenovo's Zuk Unveils Transparent Display Smartphone Prototype," dated: Aug. 14, 2015, accessed: Feb. 15, 2019, URL: http://gadgets.ndtv.com/mobiles/news/lenovos-zuk-unveils-transparent-display-smartphone-prototype-728043, 1 page.

Lumus Vision, Product Selection, URL: http://lumus-optical.com/#plx_products_section, accessed: Feb. 15, 2019, 5 pages.

Hayashi, Yuki, "The problem is other than blue light! Choose "flicker-free" for the display!" URL= https://ascii.jp/elem/000/000/898/898481/2/, dated: Jun. 2, 2014, downloaded: Oct. 26, 2020, 5 pages. [This article has been machine-translated into English].

* cited by examiner

APPARATUS AND METHOD FOR AUGMENTED REALITY

CROSS-REFERENCE TO RELATED APPLICATIONS

This application is a National Phase Entry of PCT Application No. PCT/IL2017/050859 filed Aug. 3, 2017; which claims priority from Israel Application No. 247360 filed Aug. 18, 2016. The above applications are hereby incorporated by reference in their entireties as if fully set forth herein.

FIELD OF THE INVENTION

The invention relates to augmented reality applications using smartphones.

BACKGROUND OF THE INVENTION

Augmented reality uses either direct or indirect viewing of the reality, where the reality is further augmented by overlaying additional information, typically computer-generated one, on reality. Devices using direct viewing of the reality typically contain a See-Through Display, i.e. a semi-transparent mirror (usually referred to as a combiner), through which the reality can be observed and combined with the overlaid information.

These devices typically contain a positioning element such as GPS and orientation elements such as IMU (Inertial Measurement Unit) which further contains gyros, accelerometers and magnetometer.

Example of such an Augmented Reality device is HMD (Head Mounted Display), e.g. Microsoft's HoloLens. These devices are typically bulky and heavier compared to regular eyewear, less comfortable, less esthetic and expensive. These drawbacks are among the main barriers preventing HMDs from gaining wide consumer acceptance.

To overcome these drawbacks, attempts of using mobile phone for augmented reality applications are being made. Mobile phones contain built in camera, GPS, IMU, Display, processor and wireless connectivity and are vastly used as a consumer product. As such, mobile phones lend themselves as platforms for Augmented Reality applications. Nevertheless, mobile phones enable only indirect viewing of the reality on their display screen. Therefore, when smartphone applications for augmented reality are used, the overlaid information is combined with the image of reality acquired by the phone camera, rather than the reality itself.

Mobile phone applications for augmented reality include applications developed by, for example, Layar and Metaio.

Since the viewing of the reality is indirect, i.e. only an image of the reality as opposed to the reality itself appears on the smartphone display screen, mobile phone applications as described above have significant shortcomings because display images are 2D, depend on the camera Field of View and as such provide neither a sense of distance, nor a sense of objects' dimensions, making the orientation very difficult.

Another attempt to provide augmented reality on a smartphone is the introduction of phones with transparent display screens, i.e. Lenovo's Zuk (http://gadets.ndtv.com/mobiles/news/lenovos-zuk-unveils-transparent-display-smartphone-prototype-728043). In this application the user can view the reality through the transparent screen, while additional information is displayed on the display screen. A major drawback is that the displayed information cannot be aligned with the landscape because of parallax, i.e. even if the phone is stable and the user moves his/her head, the location of the annotation on the landscape will change. This is because the landscape is far (typically tens to hundreds meters) while the phone display is near (typically 23 to 30 cm).

SUMMARY OF THE INVENTION

The present invention overcomes the above shortcomings by using a regular mobile phone as an augmented reality device as is known per se, but with the further enhancement of combining information overlaid on the reality itself rather than on the image of reality. In such manner, the invention provides for combining the overlay with no parallax, as will be clear below.

An augmented reality system according to the invention also enables designating a real object by the user, such as a building, and extracting its location from a database, such as Street View, using the phone position, camera orientation and object image.

Similarly, when the location of the object is known the system can direct the user to the object and designate it.

In both cases, once an object has been designated, a high resolution image of that object can be extracted from a database such as Street View.

Once the high-resolution image of the object has been extracted from the database, the image can be overlaid on reality, enabling performing electronic zoom-in and zoom-out operations by the user.

In case of absence of such database, the distance to the object can be determined/estimated from its image, without relying on known coordinates, based on the image, using known training methods such as Deep Learning (i.e. Yann LeCun, Yoshua Bengio & Geoffrey Hinton, "Deep Learning", Nature, vol. 521, pp 436-444, 2015). For training such methods, the training algorithm is given a large data set of images with known depth (distance of the points in the image from the camera) to at least one target location in each image. From this training set, the algorithm automatically determines a set of parameters for distance estimation to desired locations in a new image.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

In the following description of some embodiments, identical components that appear in more than one figure or that share similar functionality will be referenced by identical reference symbols.

Figure 1:
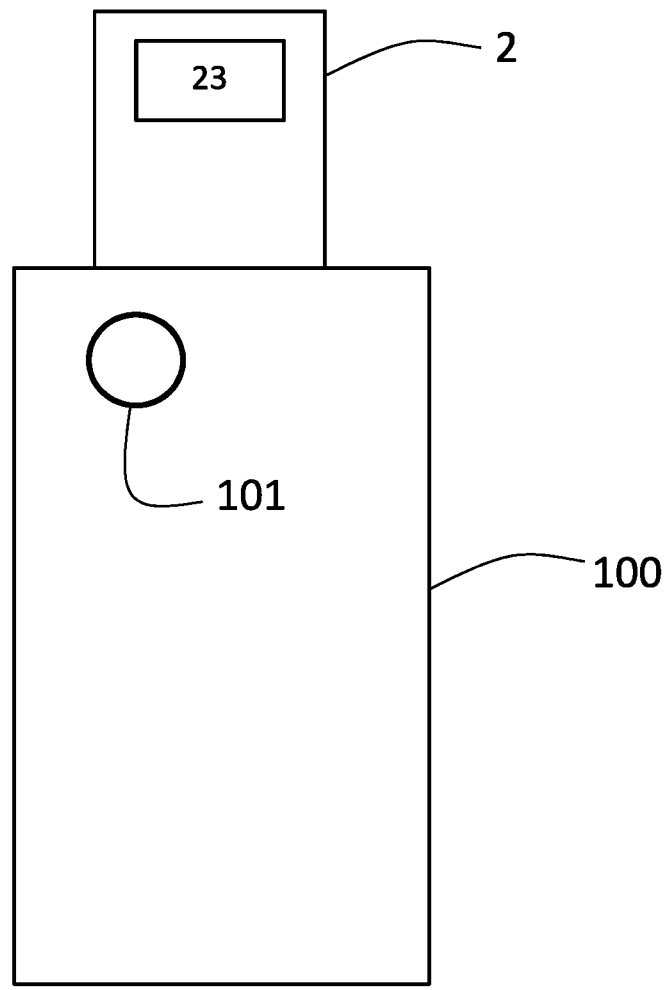
FIG. 1 is a schematic representation of the invention showing a smartphone to which a viewer is mechanically attached.
Figure 2:
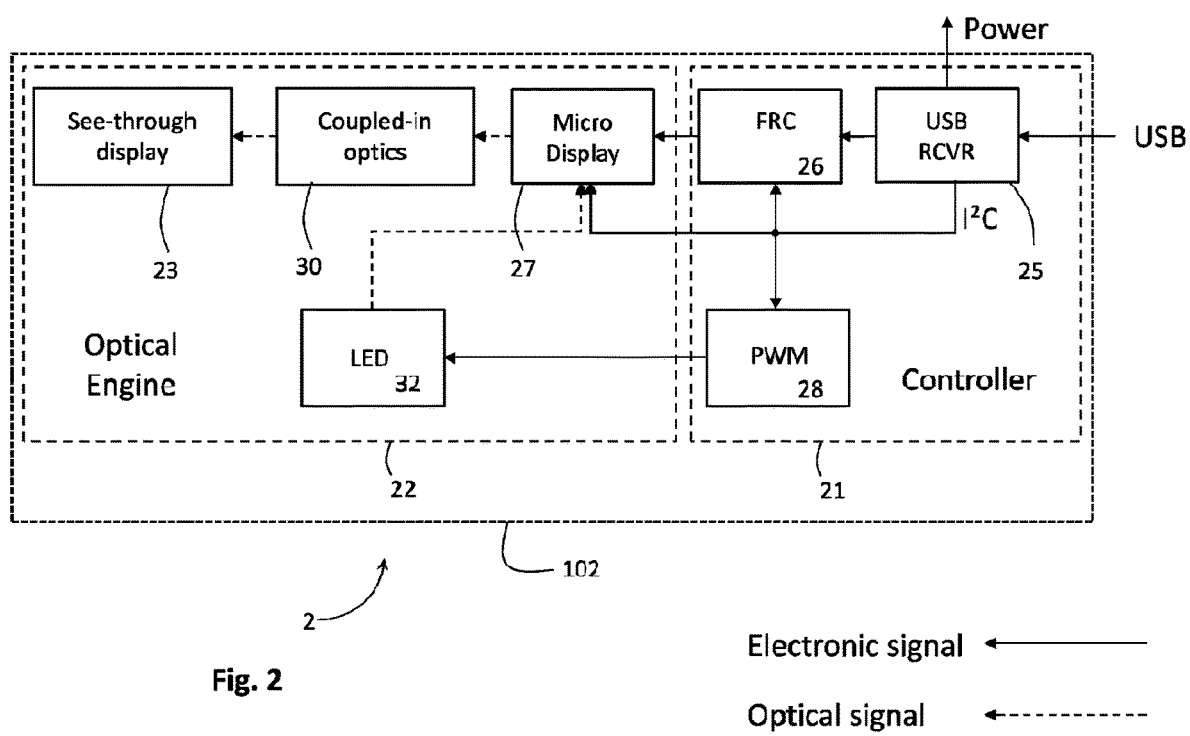
FIG. 2 is a block diagram showing the functionality of a viewer according to a first embodiment of the invention.

FIG. 1 depicts schematically an embodiment of the invention showing a smartphone 100 to which a viewer 2 (constituting an accessory) is mechanically attached. The viewer 2, as shown in FIG. 2 includes a housing 102 containing a controller 21 coupled to an optical engine 22, which may optionally be the Lumus OE-32 (see http://lumus-optical-.com/#plx_products_section), having a see-through display (combiner) 23 which is partially transparent so that the user can observe the real landscape through it. The see-through display 23 is also used to project overlaid information generated by the smartphone 100 on top of the landscape.

A first embodiment of the viewer 2 is further detailed in FIG. 2. The controller 21 has a USB receiver 25, which is configured for connecting to a USB port (not shown) of the smartphone and splits the USB signal generated by the phone to its components, i.e. control ($I^2C$, Inter-Integrated Circuit known in the art), power and video. The USB receiver also converts the video signal to a parallel 24-bit RGB signal. This converted video signal is conveyed to a Frame Rate Converter (FRC) 26 which increases the video frame rate to match a Micro Display 27 to which the converted video signal is fed by the FRC 26. The Micro Display 27 can be an organic LED (OLED), but higher illumination intensity is achieved if it is LCOS (Liquid Crystal On Silicon). If the Micro Display 27 is built on LCOS technology, the $I^2C$ signal is fed to a Pulse Width Modulator (PWM) 28, which controls the intensity of the LED 32, which illuminates the Micro Display. The LCOS micro display 27 feeds the image to the see-through display 23 via Coupled-In Optics 30, which optically projects the image generated by the micro display to the see-through display. The $I^2C$ signal is also used to control the Micro Display 27 and the FRC 26. In the less preferred case that the Micro Display 27 is an OLED, the PWM 28 and LED 32 are omitted and the $I^2C$ controls the OLED directly. Power is fed via the USB Receiver 25 to the relevant components i.e. Micro Display 27 and LED 32. Alternatively, an external battery (not shown) can be used to minimize drainage of the phone battery.

Alternatively, instead of using the phone USB interface, a different phone connection such as the Moto-Z interface (http://newatlas.com/moto-z-review/44485/) can be used.

The image displayed on the see-through display 23 is overlaid on the real landscape preferably at infinity, so no parallax between the landscape and the overlaid information exists.

Figure 3:
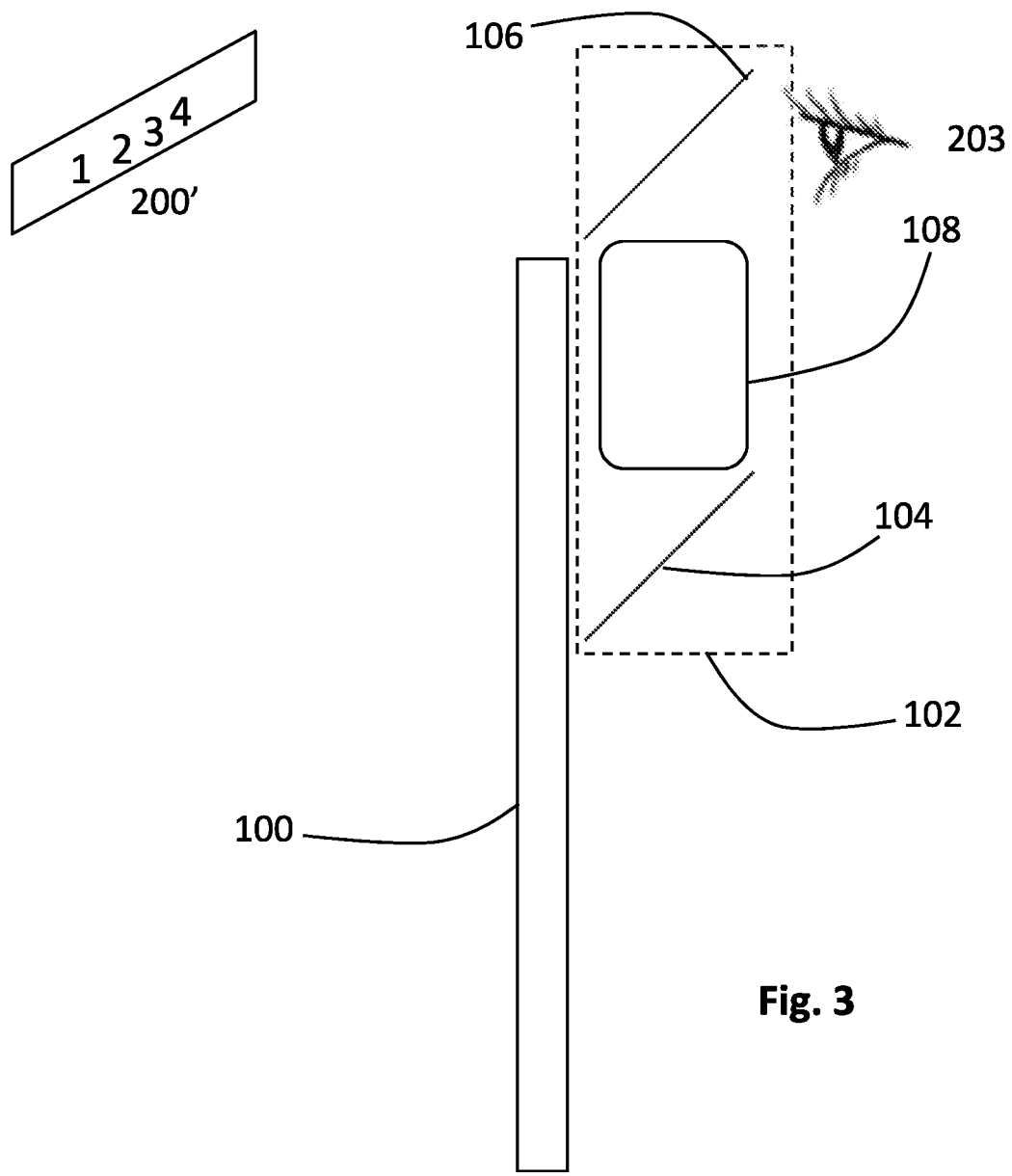
FIG. 3 shows schematically the optical components of a viewer in relationship to the display screen of the smartphone, according to a second embodiment of the invention.
Figure 4:
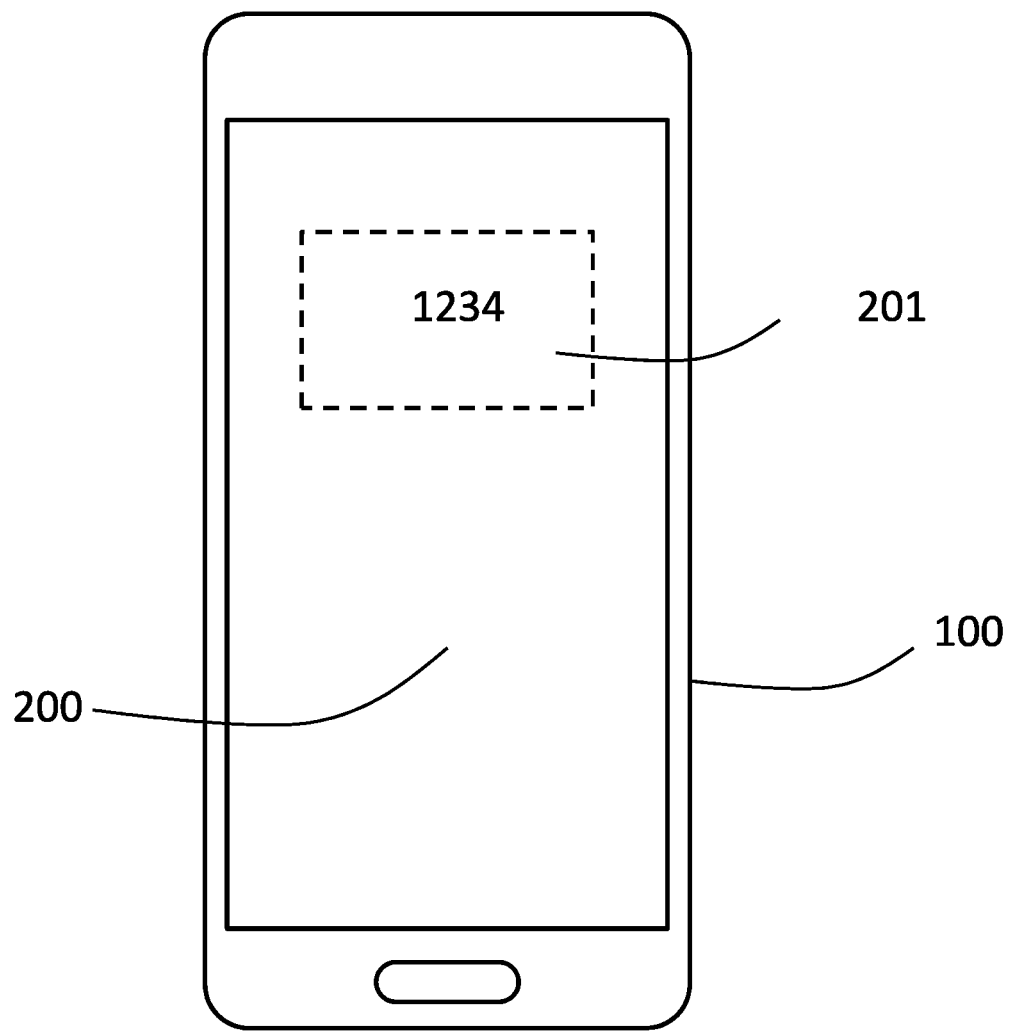
FIG. 4 shows schematically a portion of the display screen of the smartphone corresponding to an area of interest, according to the second embodiment.

Another embodiment is shown schematically in FIGS. 3 and 4. The housing 102 of the viewer 2 is mechanically attached to the smartphone 100 either directly or using an adapter. Mechanical means to attach accessories to smartphones are known in the art, i.e. Miggo's Pictar iPhone camera accessory (https://www.dpreview.com/news/1219763835/miggo-wants-to-dslr-your-iphone-with-the-pictar-grip) or Zeiss's lens accessories for smartphones (http://petapixel.com/2016/01/06/zeiss-is-jumping-into-the-world-of-smartphone-lens-accessories/. Information displayed on the smartphone display screen 200 (in this example, the numbers "1234", on an area of interest 201 in FIG. 4) is projected by the viewer 2 onto the real landscape. The manner in which this is done will now be explained.

Thus, the viewer 2 includes a mirror 104 having a reflecting surface directed toward the smartphone display screen 200 so as direct light therefrom upward to optics shown generally as 108. The optics 108 creates an image of the information displayed on the phone display screen, preferably at infinity, so that there is no parallax with the landscape. Optics 108 can also be integrated with or coupled to a focusing mechanism (not shown) for moving the optics 108 up and down so that the displayed information appears at a distance different from infinity, down to preferably a few meters, as to adapt the use of the viewer for in-door applications. A semi-transparent mirror (combiner) 106 directs this image to the observer's eye 203. Consequently, the observer sees the projected information 200' at infinity, overlaid on the real landscape which is also seen by the observer through the semi-transparent mirror 106.

Figure 5A:
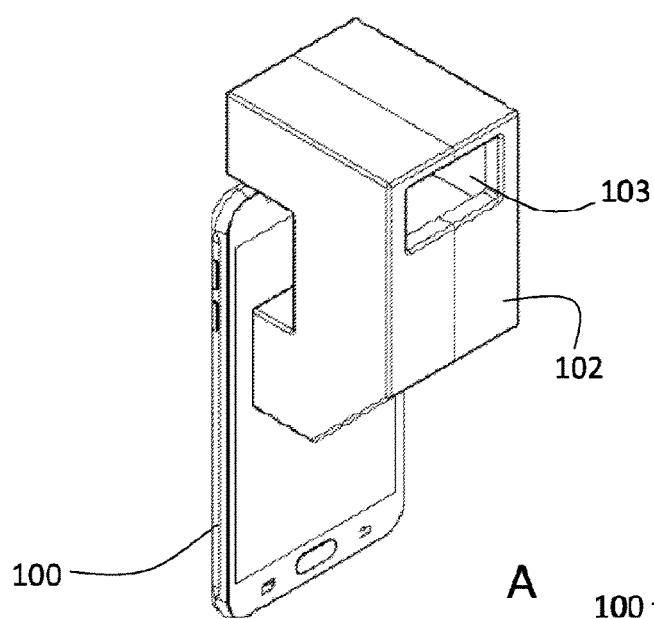
FIG. 5a is a pictorial representation of a viewer attached to a smartphone, according to the second embodiment.
Figure 5B:
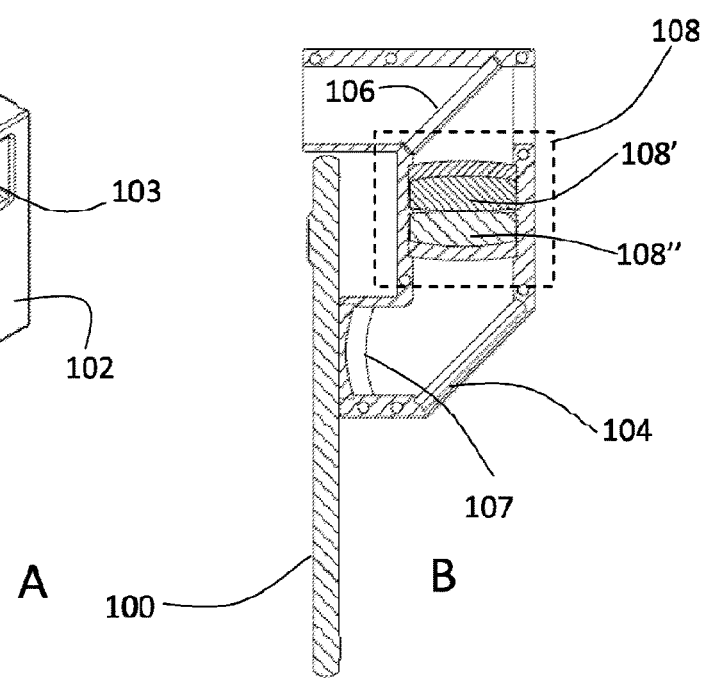
FIG. 5b shows pictorially the optical components of a viewer in relationship to the display screen of the smartphone.

A more detailed description of this embodiment is shown in FIGS. 5a and 5b. The viewer 2 is attached to a smartphone 100. The observer 203 (FIG. 3) observes the landscape and the overlaid information through an opening 103.

More details of optics 108 are shown in FIG. 5b. Optics 108 contains two identical doublets 108', 108" designed so that the image, through mirror 104, of their combined back focal plane coincides with the smartphone display screen 200. As a result, an image of the smartphone display screen is created at infinity. Also shown in FIG. 5b is a field lens 107 used to correct distortions and aberrations at the edges the field of view.

Typical parameters of this embodiment are as follows:
The dimensions of the Area of Interest 201 are 40 mm (Horizontal) and 22.5 mm (vertical).
Optics 108 is of focal length typically 75 mm, and therefore the Area of Interest 201 is projected to a field of view of 30° (horizontal) and 16.7° (vertical).

Another embodiment uses the smartphone display screen as the input to the Coupled-In Optics 30 (shown in FIG. 2) instead of the micro display 27.

It is clear to those skilled in the art that similar designs with different parameters can be made to result in different field of views.

Figure 6:
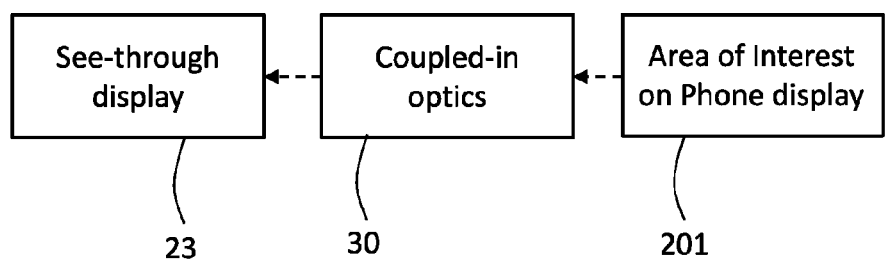
FIG. 6 is a block diagram showing schematically a third embodiment of the invention.

FIG. 6 shows another embodiment wherein coupled in optics 30 projects the image directly from the Area of Interest 201 on the smartphone display screen 200 to the see-through display 23. The coupled-in optics is adapted to the size of the Area of Interest 201. The see-through display 23 may be similar see-through displays used in smart glasses such as Google Glass, Epson Moverio, ODG R-7, Vuzix Smart Glasses. See through display may be one of the waveguide based displays such as the one used in the Lumus OE-32 referenced above (referred to by Lumus as "LOE" or "Reflective Optical Waveguide") or Microsoft Hololens.

In order to overlay relevant information on an object (either on reality or on its image), it is important to designate the object correctly, i.e. the phone's location, the direction and distance from which it is viewed and its image should be known. This is also important to enable designation of the object to another viewer located at a different location. In some cases, for example when viewed from a distance, the object cannot be observed sharply, either on a display screen using the phone camera shown as 101 in FIG. 1 or with the naked eye. In these cases it is also important to provide the user with a high resolution image and to overlay it on the object (either on a display screen or on reality).

There are two ways of zooming in/out on an image. The "conventional" way is using Optical Zoom to change the focal length of the optics by using a zoom lens. When the focal length increases the fields of view becomes narrower (referred to as "zoom in") and when the focal length decreases the fields of view becomes wider (referred to as "zoom out").

Another way common in digital cameras is to zoom in the image by looking only at a portion of the image and enlarging it using digital techniques to cover all the screen area. This is usually called "electronic zoom"

The invention provides improved zooming, as follows. Once an object has been designated, a high-resolution image of the object is extracted from a database (such as Street View) and overlaid on reality (or its image). In this way we provide a capability to see high-resolution images of objects even if the observer with his smartphone is located at a distance not allowing for high resolution imaging of the object.

Figure 7:
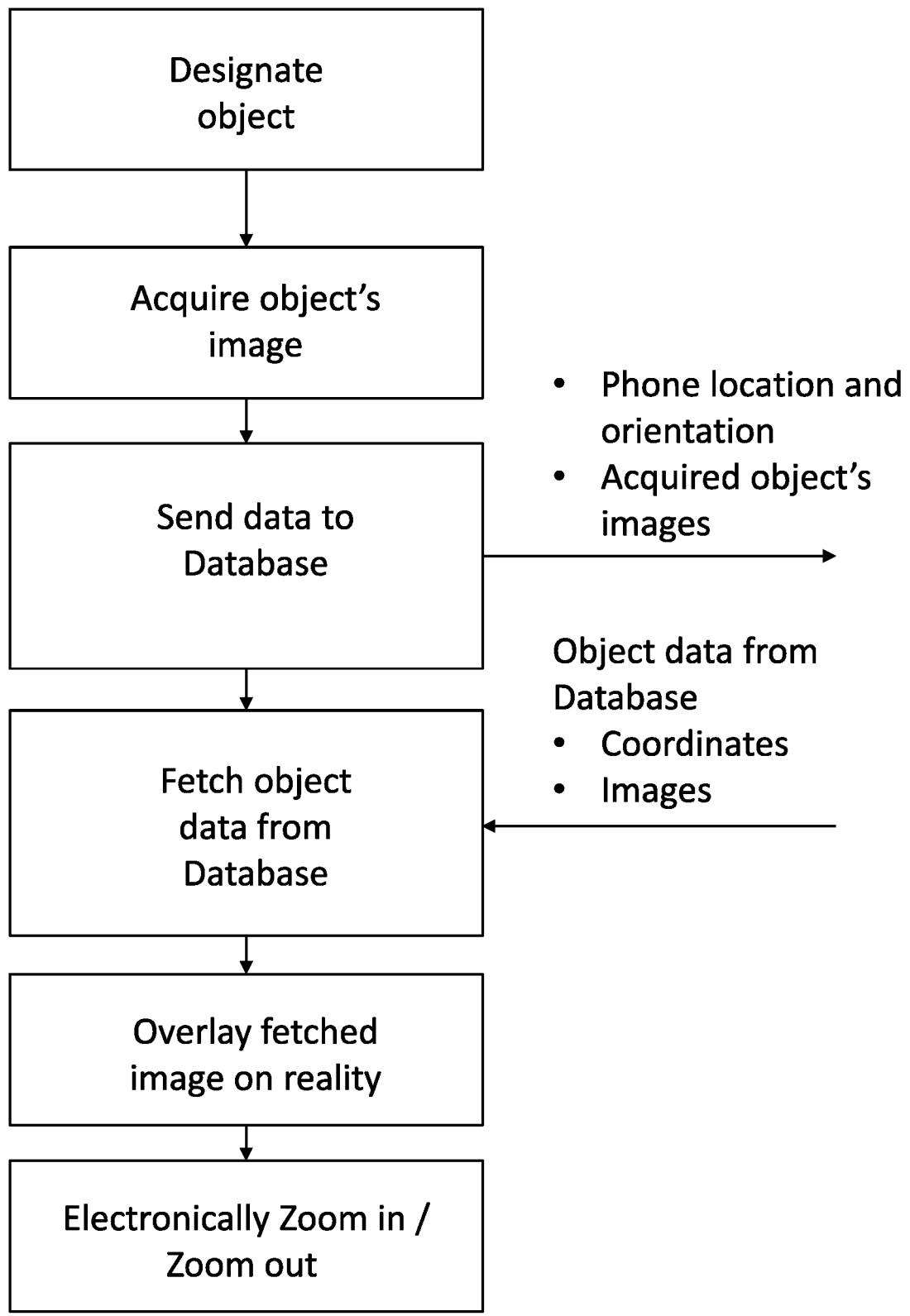
FIG. 7 is a flow diagram that summarizes the manner in which an object can be designated according to different embodiments of the invention.

As explained, the manner in which an object can be designated can be done in either of two ways:

1. As shown in FIG. 7, the user directs the viewer to an object. Phone location and orientation, as well as an image of the object acquired by the phone camera are used to extract object data, i.e. coordinates and image, from a database such as Street View. This can be done as follows. Using the phone camera location and direction, the coarse location of the object is calculated. Now the object's image acquired by the phone camera is matched with images in Street View data base at this coarse location and the object is identified in Street View database. Street View database contains the locations of the Street View camera as well as the distances and directions from the camera to the objects. Using this data the location of the object can be determined.
2. The system uses known location coordinates of an object to direct the user to the object. The known coordinates are also sent to a database, such as Street View.

In both cases, once the high-resolution image of the object has been extracted from the database, the image can be transformed so that it appears as seen from the phone location and is overlaid on reality, enabling performing electronic zoom-in and zoom-out operations by the user.

The invention claimed is:

1. An accessory configured to be mounted on to a display screen of a hand-held device for projecting information displayed on said display screen on reality and thereby converting the hand-held device to a hand-held augmented reality device, the accessory comprising a housing, the housing having:
   a front surface and a rear surface, a front opening extending from the front surface to the rear surface and through which a user can observe the reality, a rear opening on the rear surface, the housing being configured for mechanically attaching to the hand-held device with the rear opening overlapping a portion of the display screen;
   a semi-transparent mirror placed in the front opening and between the front and the rear surface;
   a mirror and viewing optics, the mirror having a reflecting surface directed toward the display screen so as to direct light therefrom upward to the viewing optics,
   the viewing optics configured to obtain, via the mirror, through the rear opening of the accessory an image of information generated by the hand-held device and displayed in said portion of the display screen and to project said image of information on the semi-transparent mirror for directing said image to an eye of a user, so that the user holding the hand-held device with the accessory mounted thereon sees through the front opening of the accessory the image of information overlaid on said reality.

2. The accessory according to claim 1, wherein the hand-held device is a smartphone.

3. The accessory according to claim 1, wherein the viewing optics is configured to create an image of the information displayed on the display screen preferably at infinity.

4. The accessory according to claim 3, wherein the optics includes a pair of optical doublets designed so that the image, through the mirror, of their combined back focal plane coincides with the display screen.

5. The accessory according to claim 3, wherein the optics is integrated with or coupled to a focusing mechanism for moving the optics so that displayed information appears closer than infinity, down to preferably a few meters, and thereby to adapt the use of the viewer for in-door applications.

6. The accessory according to claim 1, further including a field lens configured to correct distortions and aberrations at the edges of the field of view of the viewing optics.

7. The accessory according to claim 1, wherein the housing is dimensioned to capture an image of a reduced portion of the display screen, a remainder of the display screen being unobscured by the housing.

8. The accessory according to claim 1, further being configured to obtain a high-resolution image of a designated object displayed by the hand-held device and overlay the high-resolution image on reality.

9. The accessory according to claim 8, being configured to extract the high-resolution image of the object from a database and to transform the image so that it appears as seen from a location of the hand-held device, thereby enabling performing electronic zoom-in and zoom-out operations by the user.

10. An accessory configured to be mounted on to a hand-held device for projecting information generated by the hand-held device on reality and thereby converting the hand-held device to a hand-held augmented reality device, the accessory comprising:
    a housing configured for mechanically attaching to the hand-held device;
    a see-through display within the housing which is partially transparent so that a user can observe the reality through it;
    a controller within the housing configured for receiving from the hand-held device an electronic signal representative of said information and converting said electronic signal to an image, and viewing optics within the housing configured to optically project said image of information to the see-through display through which a user holding the hand-held device with the accessory mounted thereon sees the image of information overlaid on said reality.

11. The accessory according to claim 10, wherein:
    the controller is configured to connect to a data bus of the hand-held device for receiving therefrom a data signal representative of said information and for feeding a converted video signal to a micro display for displaying an image representative of said information, and the viewing optics is a coupled-in optics which optically projects the image generated by the micro display to the see-through display.

12. The accessory according to claim 11, wherein the micro display is Liquid Crystal on Silicon and the data signal is fed to a pulse width modulator adapted to control the intensity of illumination of the micro display.

13. The accessory according to claim 12, wherein the optics includes a pair of optical doublets designed so that the image, through the mirror, of their combined back focal plane coincides with the display screen.

14. The accessory according to claim 12, wherein the optics is integrated with or coupled to a focusing mechanism for moving the optics so that displayed information appears closer than infinity, down to preferably a few meters, and thereby to adapt the use of the viewer for in-door applications.

15. The accessory according to claim 10, wherein the see-through display is an optical waveguide.

16. The accessory according to claim 10, further being configured to obtain a high-resolution image of a designated object displayed by the hand-held device and overlay the high-resolution image on reality.

17. The accessory according to claim 10, wherein the viewing optics is configured to create an image of the information displayed on the display screen preferably at infinity.

18. The accessory according to claim 10, further including a field lens configured to correct distortions and aberrations at the edges of the field of view of the viewing optics.

19. The accessory according to claim 10, wherein the housing is dimensioned to capture an image of a reduced portion of the display screen, a remainder of the display screen being unobscured by the housing.

\* \* \* \* \*